US010955556B2

(12) United States Patent
MacGougan et al.

(10) Patent No.: US 10,955,556 B2
(45) Date of Patent: Mar. 23, 2021

(54) FAST GPS RECOVERY USING MAP VECTOR DATA

(71) Applicant: Apple Inc., Cupertino, CA (US)

(72) Inventors: Glenn D. MacGougan, San Jose, CA (US); Robert W. Mayor, Half Moon Bay, CA (US); Stephen J. Rhee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 15/788,533

(22) Filed: Oct. 19, 2017

(65) Prior Publication Data

US 2018/0038962 A1 Feb. 8, 2018

Related U.S. Application Data

(62) Division of application No. 14/015,976, filed on Aug. 30, 2013, now Pat. No. 9,798,011.

(60) Provisional application No. 61/696,033, filed on Aug. 31, 2012.

(51) Int. Cl.
*G01S 19/07* (2010.01)
*G01S 19/26* (2010.01)
*G01S 19/40* (2010.01)
G01S 19/24 (2010.01)
G01S 19/42 (2010.01)
G01S 19/06 (2010.01)

(52) U.S. Cl.
CPC ............... *G01S 19/07* (2013.01); *G01S 19/26* (2013.01); *G01S 19/40* (2013.01); G01S 19/06 (2013.01); G01S 19/24 (2013.01); G01S 19/42 (2013.01)

(58) Field of Classification Search
CPC .......... G01S 19/06; G01S 19/07; G01S 19/24; G01S 19/26; G01S 19/40; G01S 19/42; G01C 21/005
USPC ............ 342/357.44, 357.43, 357.23, 357.25, 342/357.63, 357.65; 701/445, 446, 469
See application file for complete search history.

(56) References Cited

U.S. PATENT DOCUMENTS

| | | | |
|---|---|---|---|
| 5,488,559 A * | 1/1996 | Seymour ................ | G01C 21/30 342/357.31 |
| 5,923,286 A | 7/1999 | Divakaruni | |
| 5,999,126 A | 12/1999 | Ito | |
| 6,546,040 B1 | 4/2003 | Eschenbach | |
| 6,640,189 B2 | 10/2003 | Perlmutter et al. | |
| 6,975,939 B2 * | 12/2005 | Edwards ................ | G01C 21/26 455/456.1 |
| 7,855,683 B2 | 12/2010 | Razoumov et al. | |

(Continued)

*Primary Examiner* — Chuong P Nguyen
(74) *Attorney, Agent, or Firm* — Dickinson Wright RLLP

(57) ABSTRACT

Methods and apparatuses to assist a global positioning system (GPS) module to determine GPS position estimates for a wireless communication device is disclosed. Processing circuitry in the wireless communication device determines a potential or an actual inaccuracy in a GPS position estimate obtained from a GPS module. The processing circuitry obtains a set of map vector data stored in or associated with the wireless communication device. The processing circuitry determines a location estimate of the wireless communication device based on at least a portion of the set of map vector data. The processing circuitry provides the location estimate to the GPS module and obtains an updated GPS position estimate from the GPS module, the updated GPS position estimate based at least in part on the location estimate provided to the GPS module.

20 Claims, 15 Drawing Sheets

(56) References Cited

U.S. PATENT DOCUMENTS

| | | | |
|---|---|---|---|
| 7,979,203 B2 | 7/2011 | Haag et al. | |
| 8,046,169 B2* | 10/2011 | Mazlum | G01S 19/50 |
| | | | 701/472 |
| 8,305,264 B1 | 11/2012 | Jones et al. | |
| 8,374,784 B2* | 2/2013 | Mazlum | G01S 19/50 |
| | | | 180/170 |
| 8,416,129 B2 | 4/2013 | Martens et al. | |
| 8,473,195 B2* | 6/2013 | Sambongi | G01C 21/165 |
| | | | 701/408 |
| 8,718,932 B1* | 5/2014 | Pack | G01C 21/30 |
| | | | 701/447 |
| 8,725,412 B2* | 5/2014 | Kobori | G01S 19/49 |
| | | | 701/446 |
| 9,226,111 B2* | 12/2015 | Marti | G01S 5/0252 |
| 9,322,665 B2* | 4/2016 | Blumenberg | G01C 21/367 |
| 9,429,437 B2* | 8/2016 | MacGougan | G01C 21/30 |
| 9,746,331 B1* | 8/2017 | Yu | G01C 21/206 |
| 9,933,527 B2* | 4/2018 | MacGougan | G01C 21/30 |
| 9,998,877 B2* | 6/2018 | Marti | H04W 4/021 |
| 10,281,279 B2* | 5/2019 | Ahmed | G01C 21/005 |
| 2009/0021424 A1 | 1/2009 | Wahlberg et al. | |
| 2009/0174600 A1* | 7/2009 | Mazlum | G01S 19/50 |
| | | | 342/357.58 |
| 2011/0071755 A1 | 3/2011 | Ishigami et al. | |
| 2011/0313648 A1* | 12/2011 | Newson | G01C 21/30 |
| | | | 701/447 |
| 2014/0035782 A1 | 2/2014 | Fischer et al. | |
| 2014/0062777 A1 | 3/2014 | MacGougan et al. | |
| 2015/0319729 A1 | 11/2015 | MacGougan et al. | |
| 2016/0097861 A1 | 4/2016 | Li et al. | |
| 2016/0238714 A1 | 8/2016 | Pyke et al. | |

\* cited by examiner

FAST GPS RECOVERY USING MAP VECTOR DATA

CROSS-REFERENCE TO RELATED APPLICATIONS

This Application is a division of U.S. patent application Ser. No. 14/015,976, filed Aug. 30, 2013, entitled "FAST GPS RECOVERY USING MAP VECTOR DATA," which claims the benefit of U.S. Provisional Application No. 61/696,033, filed Aug. 31, 2012 and entitled "FAST GPS RECOVERY AT TUNNEL EXITS USING MAP VECTOR DATA", each of which is incorporated by reference herein in its entirety for all purposes.

FIELD OF THE DESCRIBED EMBODIMENTS

The described embodiments relate generally to navigation using a wireless communication device, and more particularly to using map vector data to improve navigation at the wireless communication device.

BACKGROUND

Many wireless communication devices include hardware modules and/or software modules to provide support for Global Navigation Satellite Systems (GNSS). The United States government provides a Global Positioning System (GPS) that typically uses 31 satellites orbiting the Earth broadcasting specialized GPS signals in a 1.6 GHz frequency band. Other global positioning systems such as the Russian GLONASS and the Chinese Beidou systems function in approximately the same manner. The term GNSS can be used to refer to satellite based positioning systems in general, and the terms GNSS and GPS can be used synonymously herein to indicate satellite based global positioning systems and signals without loss of generality.

Wireless communication device based GNSS systems can try to determine a position of the wireless communication device by receiving GNSS satellite signals. Oftentimes, the position of the wireless communication device can be presented to a user of the wireless communication device through a map displayed on the wireless communication device or on a display to which the wireless communication device is coupled. The wireless communication device can attempt to determine a position based on information obtained while in poor GNSS operating conditions, which can adversely affect the accuracy of position determination and information provided for map location display. GNSS signals are prone to fade, can suffer multipath or may be blocked by structural objects such as tunnels and/or tall buildings. In these cases, a GNSS determined position may be inaccurate.

Therefore, what is desired is an enhancement of the performance of GNSS determined positioning, particularly when the wireless communication device operates in conditions that can result in poor reception of GNSS signals.

SUMMARY OF THE DESCRIBED EMBODIMENTS

This paper describes various embodiments that relate to determining a position of a wireless communication device using a global navigational satellite system. In an embodiment map location data can be used to provide assistance to a global positioning system module in the determination of a position of the wireless communication device.

Methods and apparatuses to assist a global positioning system (GPS) module to determine GPS position estimates for a wireless communication device are disclosed. Processing circuitry in the wireless communication device determines a potential or an actual inaccuracy in a GPS position estimate obtained from a GPS module. The processing circuitry obtains a set of map vector data stored in or associated with the wireless communication device. The processing circuitry determines a location estimate of the wireless communication device based on at least a portion of the set of map vector data. The processing circuitry provides the location estimate to the GPS module and obtains an updated GPS position estimate from the GPS module, the updated GPS position estimate based at least in part on the location estimate provided to the GPS module.

Map vector data can include detailed terrain and environmental information, e.g. structures such as building and tunnels, which can contribute to blocking and/or interfering with the reception of GNSS satellite signals used for GPS position determination. High-confidence position data can be provided to a position solution engine, e.g., functioning on the GPS module, as assistance data with which to supplement, initialize, re-initialize or otherwise adapt GPS position determination circuitry and/or software, e.g., as a "seed" for an adaptive filter used to determine GPS position estimates. The high confidence assistance data can include a position/location for the wireless communication device, a direction of travel, a speed of travel, or a combination of these. Additional representative high confidence data, derived at least in part from map vector data, can include tunnel entrances, tunnel exits, areas of tall buildings, and road intersections.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Wireless communication devices can include GNSS hardware and software to determine a global positioning system (GPS) position of the wireless communication device. An embodiment for improving GNSS performance can use additional available position data to assist in GNSS position determination, e.g., by providing one or more location estimates to a GPS module used to determine GPS positions. In an embodiment, high-confidence position data can be derived from map data available in storage of (and/or associated with) the wireless communication device. In some embodiments, a set of recent GNSS determined locations can be used in combination with map data to determine position data to provide to the GPS module of the wireless communication device. Map data can include map vector data and can include detailed terrain and environmental information, e.g. structures such as building and tunnels, which can contribute to blocking and/or interfering with the reception of satellite signals used for GPS position determination. The high-confidence position data can be provided to a position solution engine, e.g., functioning on the GPS module, as assistance data with which to supplement, initialize, re-initialize or otherwise adapt GPS position determination circuitry and/or software, e.g., as a "seed" for an adaptive filter used to determine GPS position estimates. The high confidence assistance data can include a position/location for the wireless communication device, a direction of travel, a speed of travel, or a combination of these. The high confidence assistance data can be derived from map data and can be selected based on an operational use of the wireless communication device, e.g., navigational software can be active on the device, and the device can be assumed to be traveling along a road indicated in the map data. A GPS module can use the high confidence assistance data to modify GPS position estimate results in combination with GPS measurements based on received satellite signals. The high confidence assistance data can be used to narrow a range of values for GPS location estimates. Representative high confidence data, derived at least in part from map data, can include tunnel entrances, tunnel exits, areas of tall buildings, and road intersections.

Figure 1A:
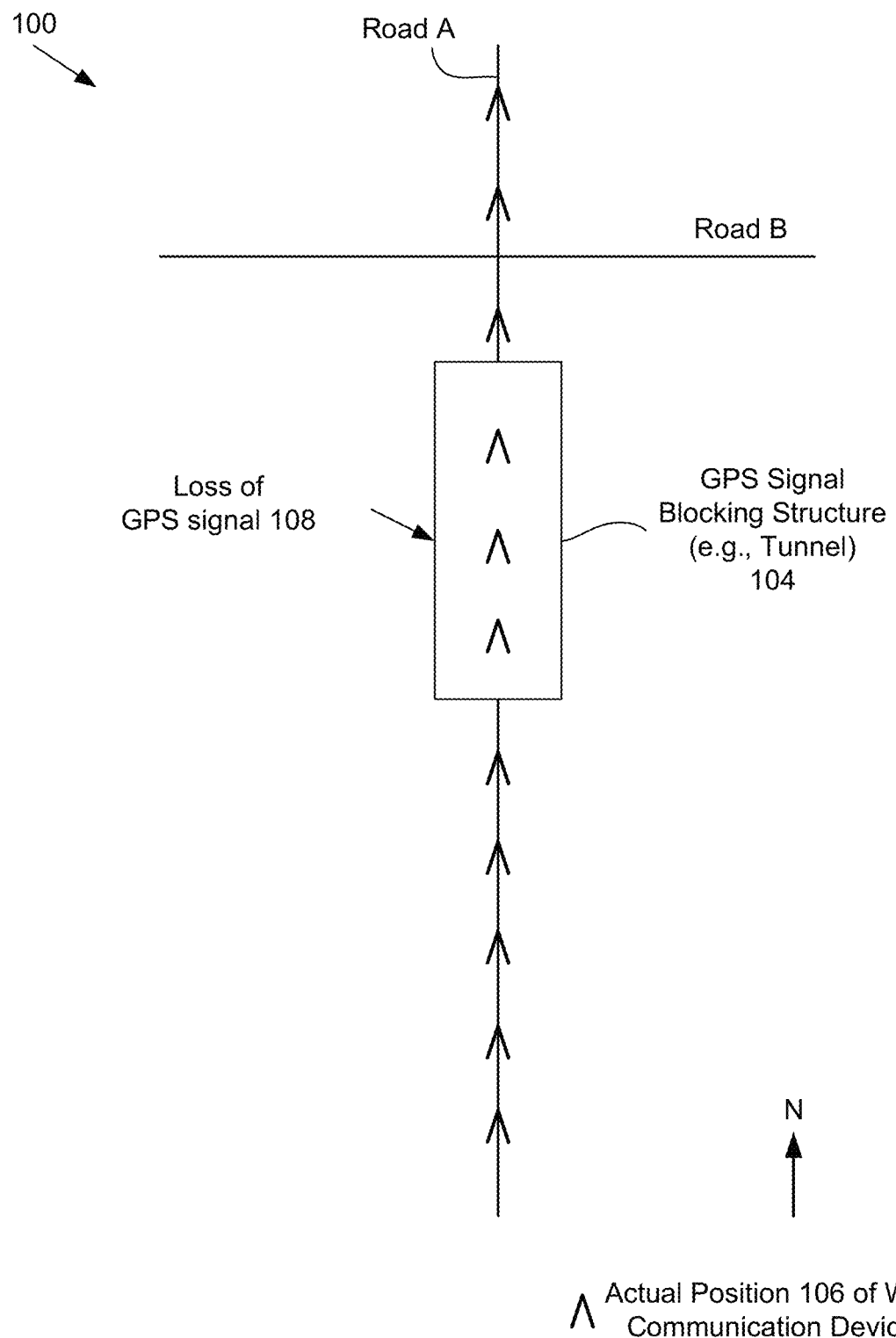
FIG. 1A illustrates a diagram of an actual position for a wireless communication device plotted on a representational map in accordance with some embodiments.

FIG. 1A illustrates a diagram 100 of an actual position 106 for a wireless communication device 102 plotted on a representational map in accordance with some embodiments. FIG. 1A provides a diagram of a wireless communication device's position 106 plotted on a simple map. In some embodiments, the wireless communication device position 106 can also represent a position of a user of the wireless communication device 102 and/or of a vehicle (or other moving transportation) in which the wireless communication device 102 operates. In the example illustrated in FIG. 1A, the wireless communication device 102 moves northward along a map feature that indicates a roadway, labeled as "Road A." Along the "Road A" roadway, a GPS signal blocking structure 104, e.g., a tunnel, can cover a portion of the roadway, and the wireless communication device 102 can lose satellite signals used for GPS navigation, e.g., GPS/GNSS signals, while inside the GPS signal blocking structure 104. The loss of GPS signals 108 can result in a GPS based location determination module being unable to update a GPS position estimate accurately. When the wireless communication device 102 emerges from the GPS signal blocking structure 104, the GPS module, e.g., a GNSS receiver, can typically need to reacquire GPS satellite signals in order to determine a GPS based position estimate for the wireless communication device, particularly when the GPS blocking structure is lengthy and/or the time without GPS satellite signals extends for awhile. As a result of passing through the GPS signal blocking structure 104, and the attendant loss of GPS satellite signals 108, the GPS based determined position estimates provided while in the GPS signal blocking structure and after exiting the GPS signal blocking structure 104 can be inaccurate. Reacquisition of signals from multiple, independent satellites and convergence of adaptive algorithms that provide GPS position estimates can require substantial time, particularly when the mobile wireless communication device 102 continues to move. GPS position estimates can depend on the number of signals received from different satellites, a time for algorithmic convergence, an amount of interference (e.g., multipath), and other factors. By providing high confidence assistance information to the GPS module, a more accurate GPS location estimate can be obtained more quickly than when relying on information obtained from GPS satellite signals alone.

Figure 1B:
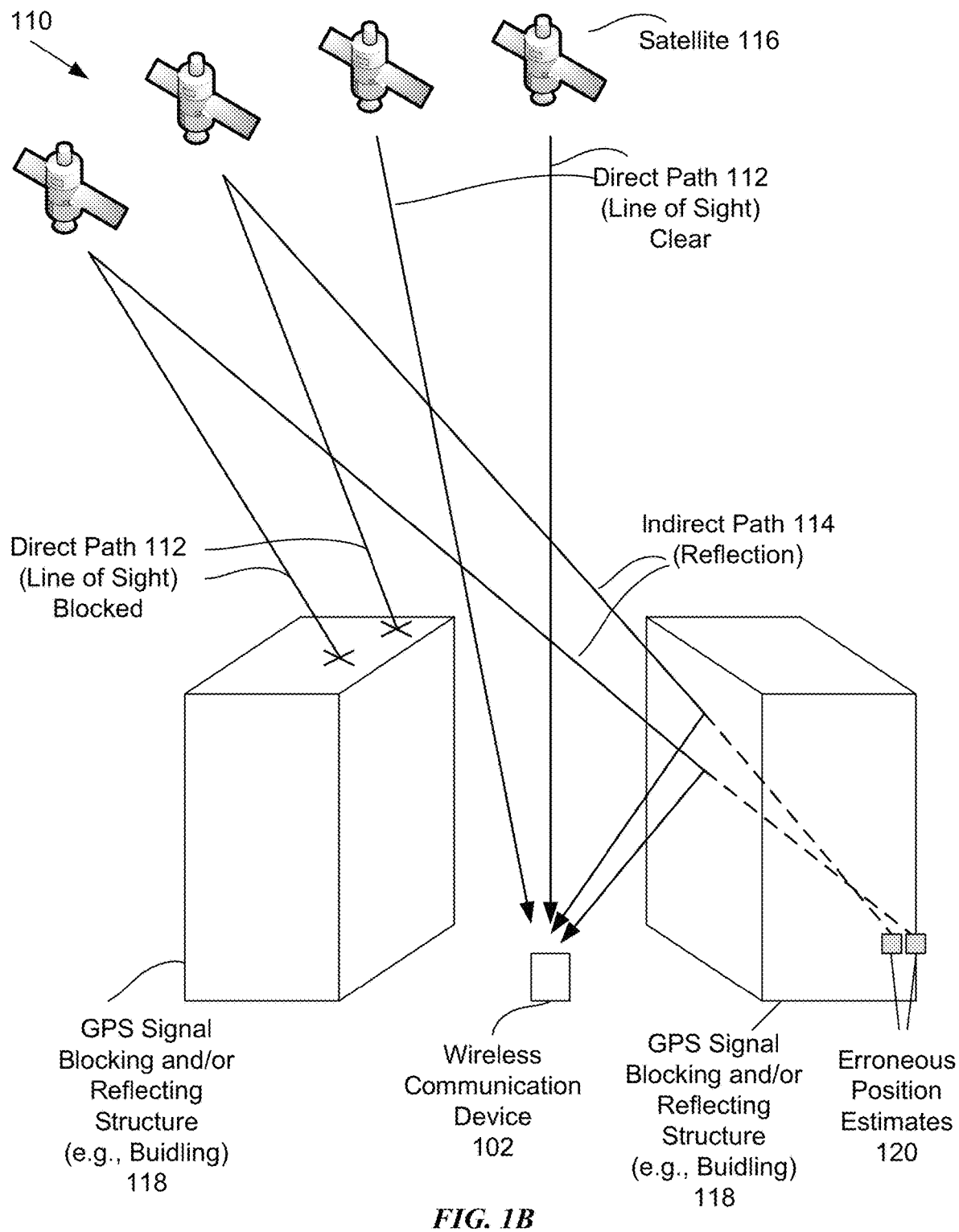
FIG. 1B illustrates a diagram of satellite signal paths to a wireless communication device in accordance with some embodiments.

FIG. 1B illustrates a diagram 110 of satellite signal paths to a wireless communication device 102 in accordance with some embodiments. A GNSS/GPS satellite based global navigation system can use an array of satellites 116 circumnavigating the globe to provide GPS signals across a wide region of the globe's surface. Signals from multiple independent satellites 116 can be required to determine an accurate GPS position estimate, which can include one or more of a latitude, a longitude, an altitude, a direction of travel, and a speed of travel. When the wireless communication device 102 is in an open location with direct visibility to multiple independent satellites, a GPS location estimate can be determined with relatively high accuracy. When the wireless communication device 102 is positioned in a GPS blocking structure 104, as illustrated in FIG. 1A, or among a set of GPS blocking and/or reflecting structures, e.g., buildings, 118 as illustrated in FIG. 1B, GPS position estimates can be less accurate. The wireless communication device 102 can receive some GPS satellite signals along direct paths 112, in which a line of sight between the wireless communication device 102 and the satellite 116 is clear. The wireless communication device 102 can also receive some GPS satellite signals along indirect paths 114 (e.g., reflected off of buildings or other signal reflective structures) that can result in erroneous GPS position estimates 120. The direct path 112 line of sight signals for certain satellites can be blocked by one or more GPS signal blocking structures 118. The combination of direct path and indirect path signals can result in a higher uncertainty in the accuracy of the GPS location estimates derived from the GPS signals. The reflected "multi-path" signals can interfere with the direct signals. A combination of blocked and/or reflected GPS signals (and/or a limited number of visible direct line of sight satellites) can occur in dense urban areas that include multiple tall buildings, e.g., "urban canyons." The wireless communication device 102 can include map vector data (e.g., to display map information to a user of the wireless communication device 102) that can be used to improve the accuracy of GPS location estimates as described herein.

Figure 2:
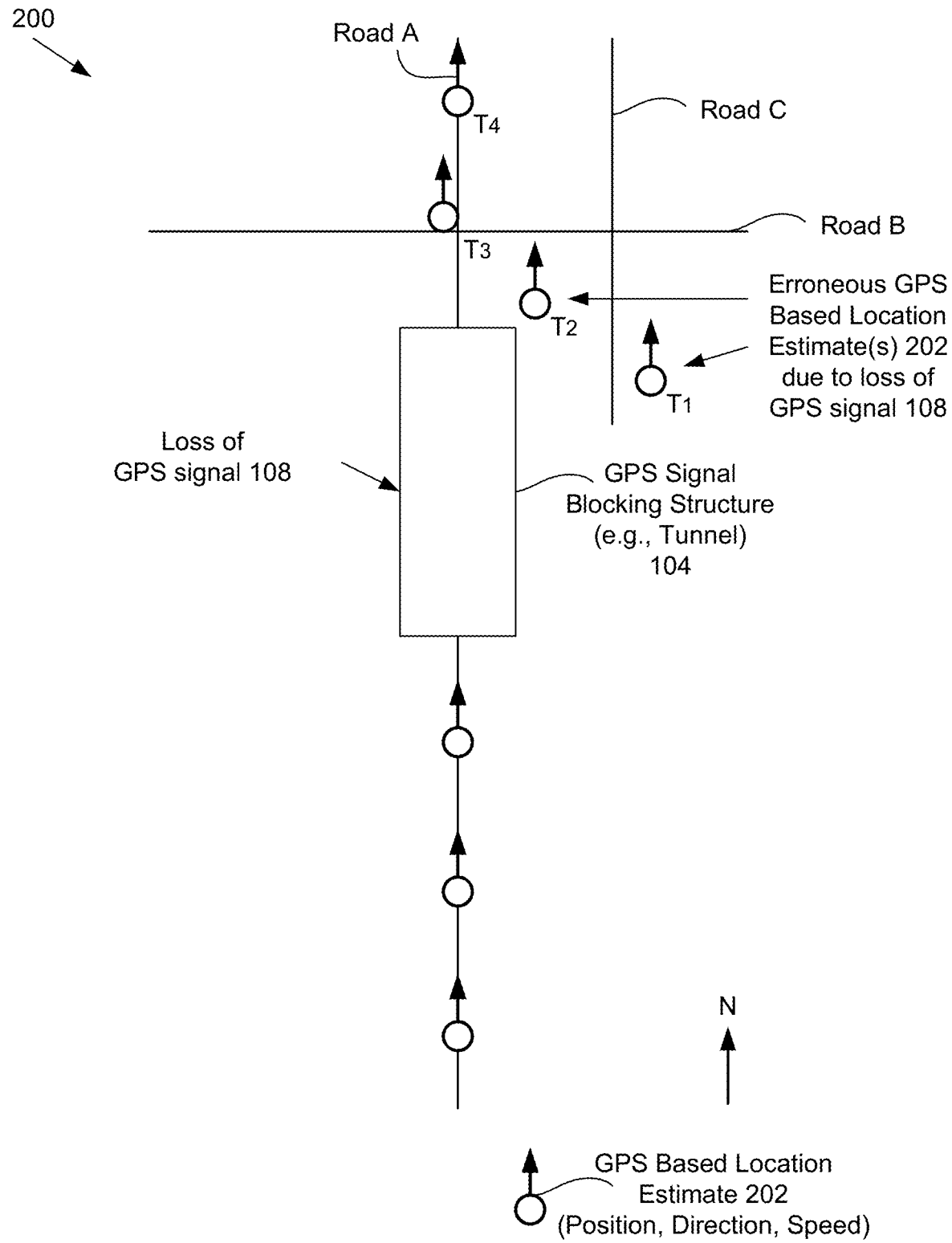
FIG. 2 illustrates a diagram of possible GNSS solutions based upon receiving GNSS satellite signals in accordance with some embodiments.

FIG. 2 illustrates a diagram 200 of possible GNSS solutions (e.g., GPS based location estimates 202) based upon receiving GNSS satellite signals in accordance with some embodiments. The GPS based location estimates 202 can include combinations of position, direction and speed for the mobile wireless communication device 102. As the mobile wireless communication device 102 travels northward prior to entering the GPS signal blocking structure 104 (e.g., a tunnel), the mobile wireless communication device 102 can have a clear view of the sky (and therefore of a number of satellites from which to receive satellite signals), and the GNSS hardware and software included in the wireless communication device 102 can determine a set of GPS based location estimates 202. When the mobile wireless communication device 102 travels through the GPS signal blocking structure 104, a loss of GPS signal reception 108 can occur, and a GPS module in the wireless communication device 102 can no longer accurately determine a position estimate for the wireless communication device 102. When the wireless communication device 102 emerges from the GPS blocking structure 104, GPS position estimates provided by the GPS module can be incorrect as the GPS module can be seeking to reacquire satellite signals (and/or the hardware/software algorithms can be slowly converging to provide more accurate GPS position estimates over time.) Initial GPS position estimates can be erroneous upon exit from the GPS signal blocking structure, as indicated by the GPS location estimates at times T1 and T2 as indicated in FIG. 2. The wireless communication device 102 can include map display software that can provide information to a user of the wireless communication device 102, e.g. a display position for the wireless communication device 102 overlaid on a geographic map based on map data stored in and/or associated with the wireless communication device 102. A simple algorithm to "snap" a GPS position estimate to a display location, e.g., aligning with a closest map feature element such as a road, can result in an erroneous display of the wireless communication device 102 location. In the representative example shown in FIG. 2, the erroneous GPS location estimates 202 can be incorrectly "snapped" to a "Road C" instead of a "Road A" when the GPS location estimates are inaccurate following an exit from the GPS signal blocking structure 104. As shown in FIG. 2, the GPS location estimates provided by the GPS module can improve over time, and eventually align with the actual position of the wireless communication device 102, e.g., as shown for times T3 and T4. Knowledge of the map vector data, however, can be used to improve the GPS location estimates for the earlier times T1 and T2.

Figure 3A:
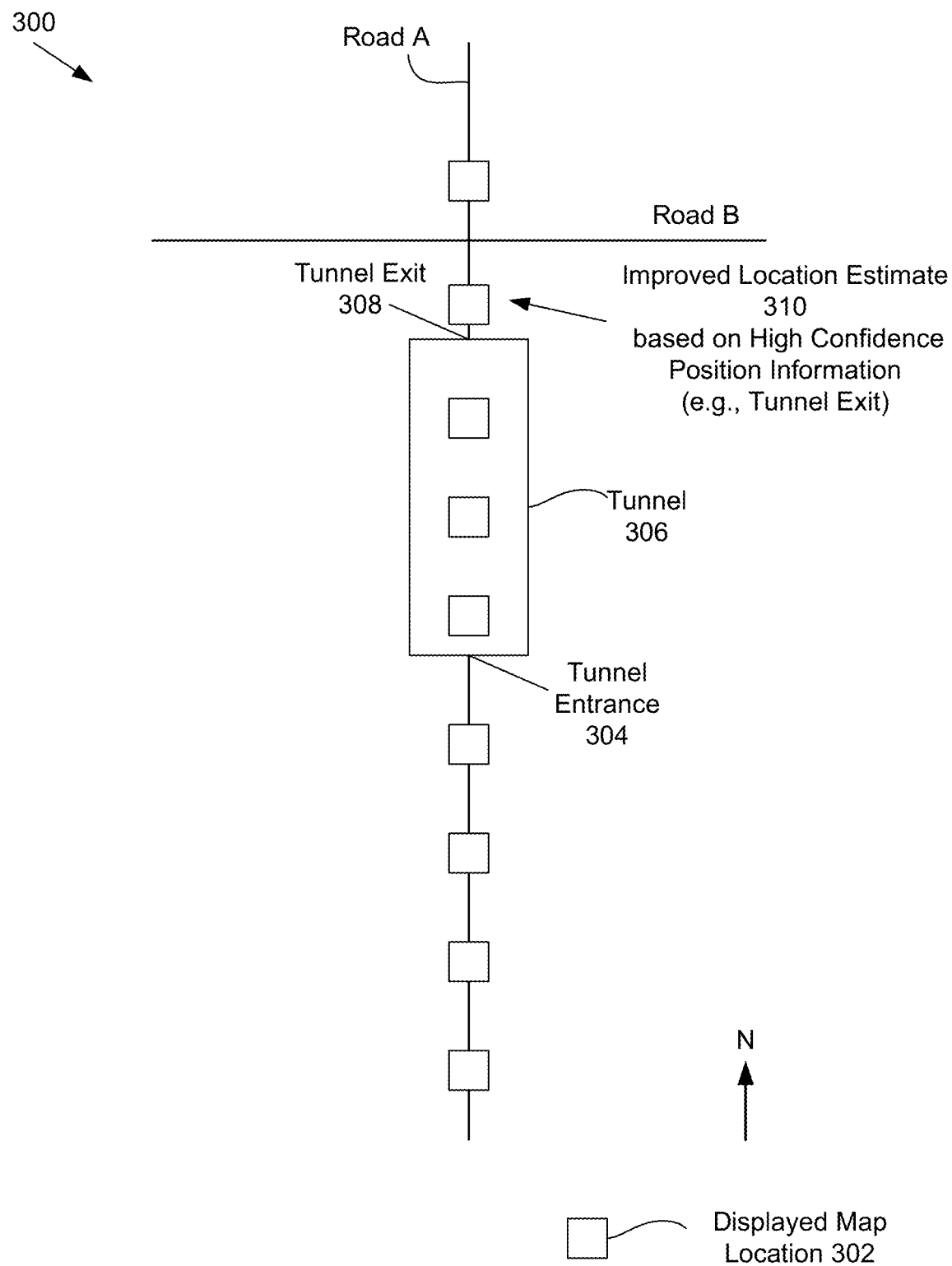
FIG. 3A illustrates a diagram of a set of location estimates of a wireless communication device displayed on a map based on position estimates determined using GNSS satellite signals and additional location assistance data in accordance with some embodiments.

FIG. 3A illustrates a diagram 300 of a set of location estimates of a wireless communication device 102 displayed on a map based on GPS position estimates determined using GPS satellite signals, and in some instances using additional location assistance data in accordance with some embodiments. As the mobile wireless communication device 102 heads north, its position can be determined by GPS hardware and software and additional logic can determine a displayed map location 302 that "snaps" the wireless communication device 102 to a map feature, e.g., "Road A." When the wireless communication device 102 enters a GPS signal blocking structure 104, e.g., tunnel 306, signals from the satellites used to determine GPS position estimates can be lost. A displayed map location estimate 302 can still be updated based on a history of previous position estimates and velocity (direction plus speed) information. Map vector data that can provide additional information about the GPS signal blocking structure 104 (tunnel 306) can also be used to determine a displayed map location 302 for the wireless communication device 102 while in the GPS signal blocking structure 104 (tunnel 306). Map vector data can also include information about the tunnel entrance 304, the tunnel length, additional tunnel segments and directional flows, and the tunnel exit 308. When the mobile wireless communication device 102 exits the tunnel 306, the GPS module (GNSS hardware) can seek to reacquire GNSS signals from a set of satellites 116; however, a limited number of satellites 116 may initially be reacquired. As a result the GPS location estimates provided after exiting the tunnel 306 can be error prone. The wireless communication device 102, however, can have available high-confidence position data, e.g., based on previously valid GPS location estimates and a set of map vector data. The high-confidence position data can be used to provide assistance to a location determining subsystem, such as the GPS module, in the wireless communication device 102. In one embodiment, the location determining subsystem can determine a GPS position estimate based on pseudo-ranges calculated from GPS satellite data and from at least a portion of the map vector data. Map vector data can be used to improve the accuracy GPS location estimates provided by the GPS module. For example, at least a portion of the map vector data can be used to restrict a set of possible choices for a GPS position estimate of the wireless communication device 102 (e.g., in general, the map vector data can be used to alter probability distributions for a set of position estimates for the wireless communication device 102.) Additionally, the map vector data can include structural information such as a position of the tunnel entrance 304, the tunnel exit 308, a length of the tunnel 306, etc. Using the structural information, and previous GPS position estimates, a high-confidence position estimate for the wireless communication device 102 can be determined. In an embodiment, upon exiting the tunnel 306, the tunnel exit position (and/or a position derived from the tunnel exit position and other known data, such as velocity and time of travel) can be provided to the GPS module of the wireless communication device 102 in order to improve the GPS position estimates provided therefrom. FIG. 3A illustrates an improved location estimate 310 for the wireless communication device 102 upon exit from the tunnel 306 at the tunnel exit 308 that can have a high probability of being more accurate than a "raw" GPS position estimate based on limited GPS satellite signal information after an extended loss of GPS signal information by the wireless communication device 102.

Figure 3B:
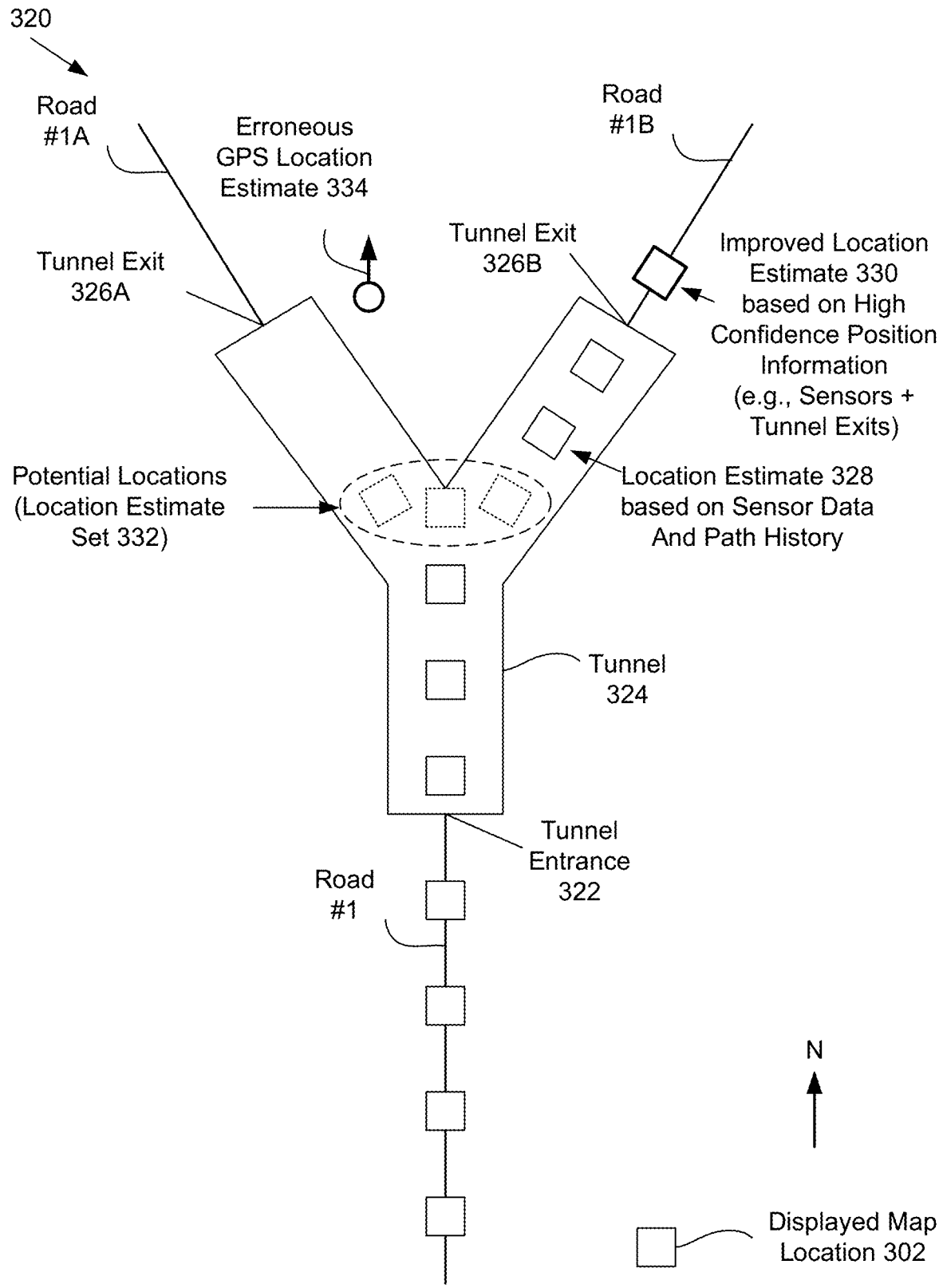
FIG. 3B illustrates another diagram for a set of location estimates of a wireless communication device in accordance with some embodiments.

FIG. 3B illustrates another diagram 320 with a set of displayed map location estimates 302 of a wireless communication device 102 in accordance with some embodiments. The wireless communication device 102 can initially be travelling northward along a map feature labeled as "Road #1." After entering a GPS signal blocking structure 104 (tunnel 324), the wireless communication device 102 can lose contact with some or all satellites 116 from which GPS signals were previously received. While in the tunnel 324, the displayed map location 302 can be determined based on knowledge of previous GPS location estimates, a set of map vector data (e.g., information about the tunnel 324), velocity information, and/or other sensor data. The tunnel 324 illustrated in FIG. 3B includes multiple tunnel exits 326A/B. While in a first section of the tunnel 324 after the tunnel entrance 322, position locations can be determined for the wireless communication device 102; however, at and following the bifurcation of the tunnel 324, the wireless communication device 102 can be uncertain (illustrated as a set of location estimates 332). In some embodiments, the wireless communication device 102 includes one or more sensors from which a direction of travel, a turn, a change in direction, or other change in position information of the wireless communication device 102 can be provided that assist in determining in which branch of the tunnel 324 the wireless communication device 102 is travelling. The location estimate 328 illustrated indicates that the wireless communication device 102 travels in the "right" branch of the tunnel 324. Upon exiting the tunnel 324, the wireless communication device 102 can reacquire signals from one or more satellites 116. Initially, GPS location estimates provided by a GPS module in the wireless communication device 102 can be less accurate as satellite reacquisition and convergence of adaptive filters in the GPS module occur. FIG. 3B illustrates a representative erroneous GPS location estimate 334 that can be provided by the GPS module when the mobile wireless communication device 102 exits the tunnel 324. Without assistance data, the wireless communication device 102 can provide an erroneous map location display to the user thereof, e.g., showing the wireless communication device 102 on Road #1A based on assuming the wireless communication device 102 exits from tunnel exit 326A (closest exit to the erroneous GPS location estimate 324). With assistance data, e.g. an indication that the wireless communication device 102 has travelled in the right hand branch rather than the left hand branch of tunnel 324, an improved location estimate 330 on Road #1B can be determined and displayed based on high confidence position information (e.g., knowledge of a position of the tunnel exit 326B) and sensor information available in the wireless communication device 102.

Figure 4:
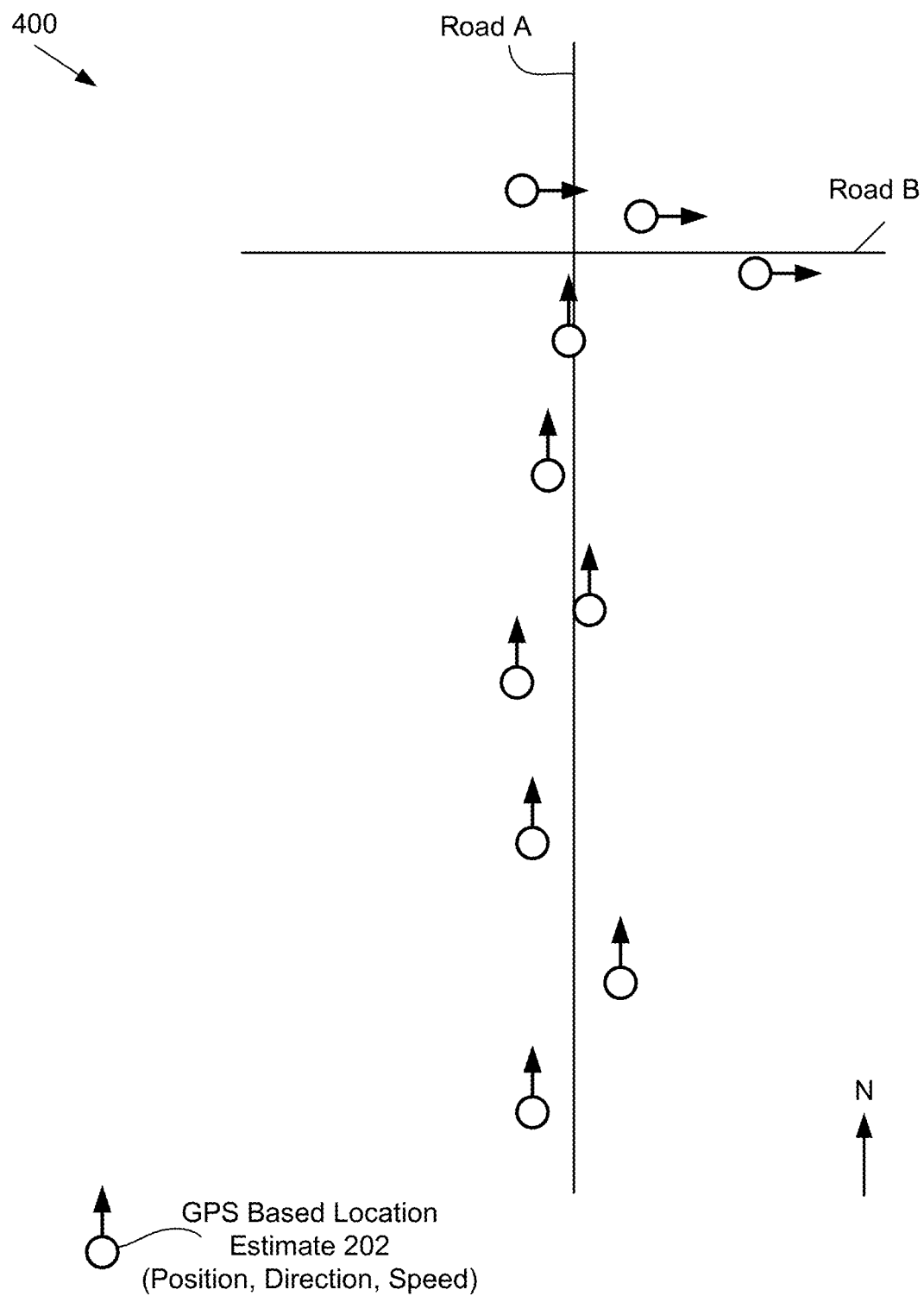
FIG. 4 illustrates a set of GNSS solutions of a wireless communication device as the wireless communication device travels northward on Road A and then eastward on Road B.

FIG. 4 illustrates a diagram 400 of a set of predicted positions of the wireless communication device 102 based on a combination of a set of GNSS solutions and map vector data in accordance with some embodiments. The set of GNSS solutions illustrates GPS based location estimates 202, including a position, direction, and speed, for a mobile wireless communication device 102 as the mobile wireless communication device 102 heads northward on map feature labeled "Road A" and then turns to travel eastward on a map feature labeled "Road B." The GNSS solutions 202 are illustrated with a circle to indicate a position and an arrow to indicate a direction of travel. As shown here, the GNSS solutions 202 may not be precisely positioned on the roadway, as there is an uncertainty in precision for each GPS based location estimate 202, but the set of GPS based location estimates can instead be relatively close to the road. Typically, the GNSS solutions 202 can also include an associated speed component. In some embodiments, for a given current (and/or history of) position and speed of the wireless communication device 102, a prediction can be made regarding the next position of the wireless communication device 102.

Figure 5:
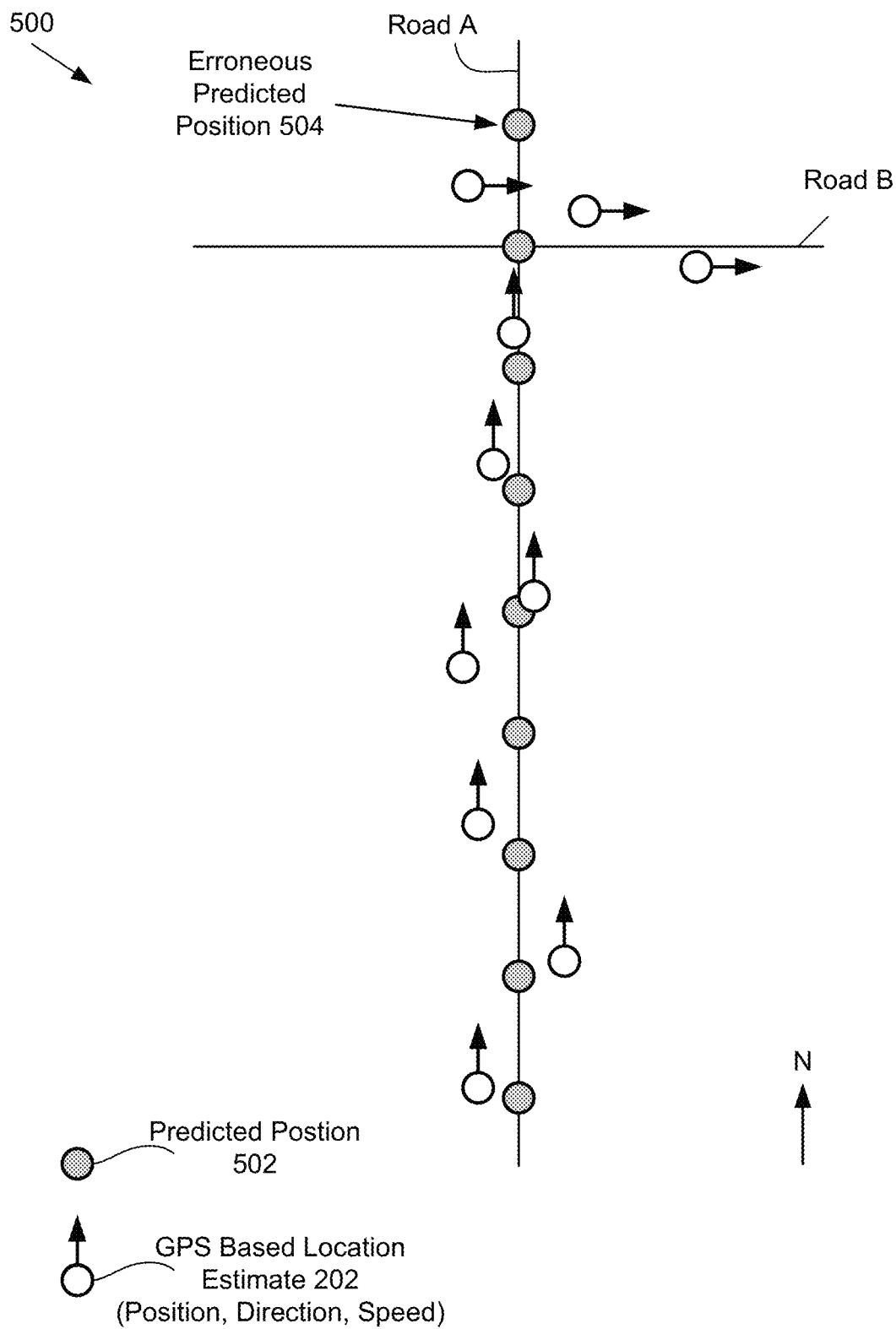
FIG. 5 illustrates a set of predicted positions of the wireless communication device based on a combination of a set of GNSS solutions and map vector data in accordance with some embodiments.

FIG. 5 illustrates a diagram 500 of a representative set of position estimates for a wireless communication device in accordance with some embodiments. As shown, a set of GPS location estimates 202 can be converted into a set of predicted positions 502 of the wireless communication device based on the GNSS solutions 202 provided by a GPS module in the wireless communication device 102 and on map vector data obtained by the wireless communication device 102. A shaded circle can indicate a predicted position 202 of the wireless communication device 102 placing the wireless communication device 102 on a particular map feature, e.g., "Road A." As the wireless communication device 102 heads northward on Road A, the wireless communication device 102 can predict a future position 502 based on a set of one or more previous determined positions 502, previous determined speeds, and map vector data. As shown, the wireless communication device 102 can predict (somewhat incorrectly) that the wireless communication device 102 will continue to travel northward on Road A and can not anticipate the illustrated turn onto Road B. In some embodiments, the wireless communication device 102 can account for intersections at which a change in direction can occur by forming a set of possible predicted positions that include various changes in direction possible at an intersection (or other map feature at which multiple exit points can exist). In some embodiments, a probability can be associated with each of the different predicted positions. In some embodiments, sudden changes in direction may be discounted in a position prediction algorithm by the wireless communication device 102 and may contribute to erroneous predicted positions 504 as illustrated.

Figure 6:
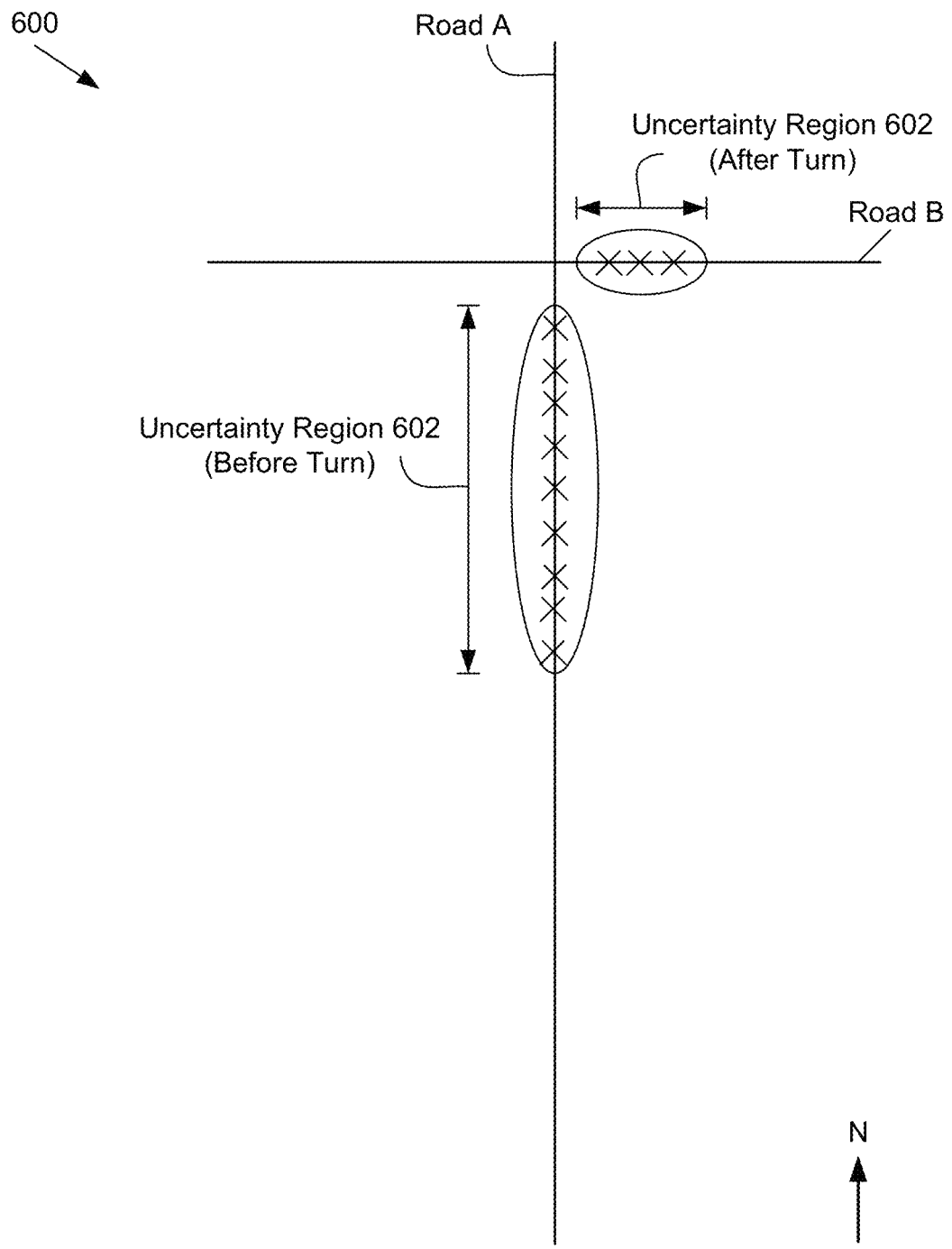
FIG. 6 illustrates a representative set of position estimates for a wireless communication device in accordance with some embodiments.

FIG. 6 illustrates a diagram 600 of a representative set of position estimates for a wireless communication device 102 in accordance with some embodiments. A set of position estimates can be generated based on information provided by GPS position estimates, a set of map vector data, and previous sets of position estimates. The wireless communication device 102 can include position estimate algorithms (software and/or hardware) that generate sets of position estimates, with each position estimate associated with a probability of occurrence. In some embodiments, the set of position estimates can be referred to as an "uncertainty region" 602. When the wireless communication device 102 is travelling northward on Road A, as indicated in FIG. 6, the uncertainty region 602 before the turn can include a length of the Road A and a corresponding narrower width (less likely for the wireless communication device 102 to be off the road). The length of the uncertainty region 602 can depend on a number of factors, e.g., velocity, history of position, accuracy of GPS estimates, etc. Following a turn of the wireless communication device 102 from Road A to Road B, as shown in FIG. 6, the uncertainty region 602 associated with position estimates of the wireless communication device 102 can change. As indicated, the uncertainty region 602 following a turn can shrink in width, as the intersection at which the turn occurred can be a known point (e.g., provided from map data). Indication of the turn can be determined based on a combination of one or more of: GPS position estimates and sensor data (e.g., accelerometer, gyroscope). As the direction of the turn and a relatively precise time of the turn can be determined along with the precise position of the intersection, the uncertainty region 602 after the turn associated with the estimated position set of the wireless communication device 102 can substantially change (e.g., narrow in length). Based on an observation of the change in uncertainty region 602 properties, logic in the wireless communication device 102 can provide assistance information about the estimated position of the wireless communication device 102 after the turn to a GPS module in the wireless communication device 102. In an embodiment, the logic can supply coordinate information for the intersection (or a point nearby) to the GPS module in which to improve the accuracy of GPS position estimates following the turn. In some embodiments, logic in the wireless communication device 102 can provide an estimate of the position of the wireless communication device 102 based on the uncertainty region 602 after a change in direction, e.g. a median point of the uncertainty region 602 can be provided to the GPS module. In some embodiments, the intersection information from map vector data can be provided along with the median point of the uncertainty region 602 to the GPS module.

Figure 7:
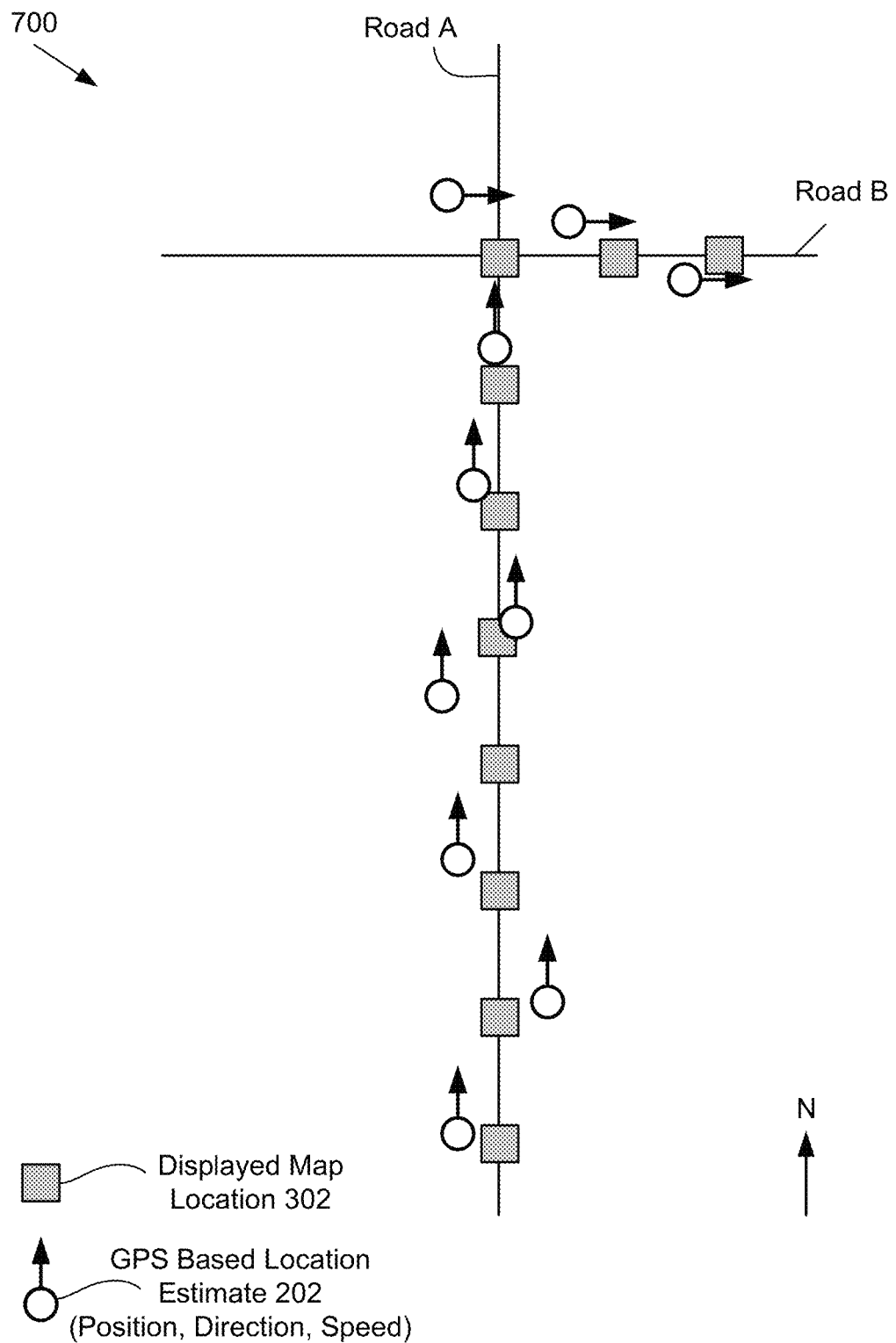
FIG. 7 illustrates a set of GNSS position estimates and a set of corrected position estimates for a wireless communication device in accordance with some embodiments.

FIG. 7 illustrates a diagram 700 of a set of GNSS position estimates 202 and a set of corrected position estimates used to display map locations 302 for a wireless communication device 102 in accordance with some embodiments. In this figure, shaded squares can represent corrected positions of the wireless communication device with respect to a set of map vector data that can be displayed to the user of the wireless communication device 102. In this example, map vector data and additional assistance information coming from or derived from sensors included in the wireless communication device 102 can be used to assist in determining the corrected position 302 of the wireless communication device 102. In one embodiment, additional assistance information can come from co-located accelerometer and gyroscope data available from sensors in the wireless communication device 102. For example, accelerometer data and map vector data can be used to provide high-confidence assistance data to determine a position of the wireless communication device 102. In some embodiments, a set of GPS based location estimates 202 can be supplemented by the high-confidence assistance data to improve a set of predicted location estimates (e.g., such as displayed in FIG. 6). In some embodiments, the high-confidence assistance data can be used to refine a set of position estimates to provide a set of corrected position estimates to present as displayed map locations 302 to the user of the wireless communication device 102. As illustrated in FIG. 7, the displayed map locations 302 can correctly indicate a turn of the wireless communication device from a Road A to a Road B. In some embodiments, at least a portion of the high-confidence assistance data and/or the corrected location estimates 302 can be provided to a GPS module in the wireless communication device 102, e.g., to assist in determining additional GPS position estimates.

Figure 8:
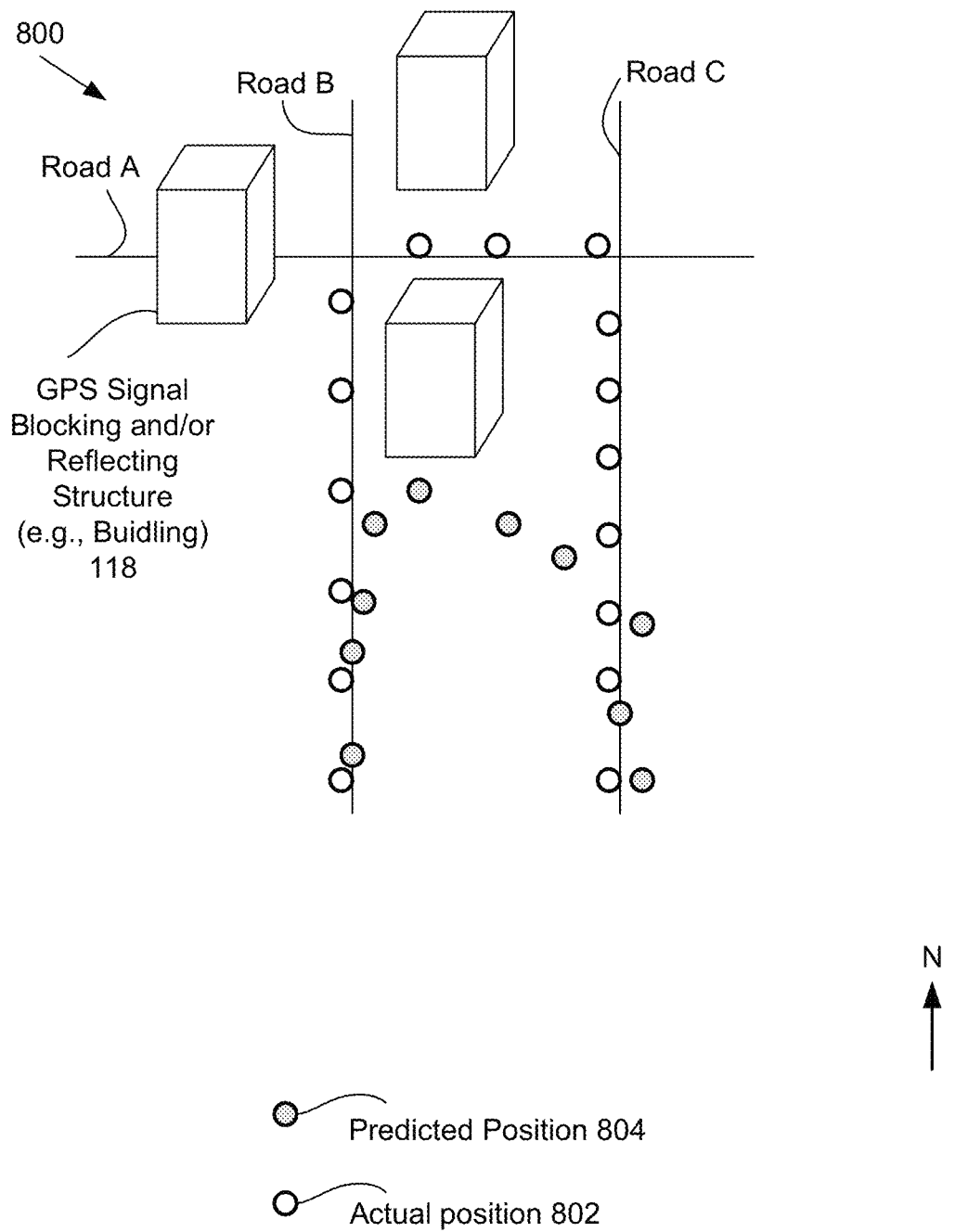
FIG. 8 illustrates another set of GNSS position estimates and a set of actual positions for a wireless communication device in accordance with some embodiments.

FIG. 8 illustrates a diagram 800 of another set of predicted position estimates 804 (e.g., provided by and/or based on GPS position estimates from a GPS module) and a set of actual positions 802 for a wireless communication device 102 in accordance with some embodiments. This diagram 800 shows another example when predicted positions 804 for the wireless communication device 102 can be incorrect. The empty circles show a series of actual positions of the wireless communication device 102, as the wireless communication device 102 proceeds northward along Road B, turns onto Road A, and then turns onto Road C. Portions of the traversed path can include sections in which tall buildings (or other GPS signal blocking and/or signal reflecting structures 118) can affect a GNSS derived position, e.g., by blocking satellite signals and/or by introducing multi-path to satellite signals. Position estimates provided from the GPS module (and/or derived from GPS based estimates) can be inaccurate due to the limited information available for the GPS module. As a result, a GPS based solution may incorrectly determine a position of the wireless communication device 102, e.g., as illustrated by the shaded circles that veer off the roadway in contrast to the actual path of the wireless communication device 102. While the GPS based predicted positions 804 can correctly indicate a turn eastward and then southward, the actual position of the wireless communication device 102 provided by GPS based estimates alone can be substantially different from the actual position of the wireless communication device 102. Additional data, e.g., as provided by sensors and/or by using map vector data, can be used to correct the predicted positions (e.g., for display on a map to a user of the wireless communication device 102) and/or to provide high-confidence assistance data to the GPS module in order to improve GPS estimates provided therefrom.

Figure 9:
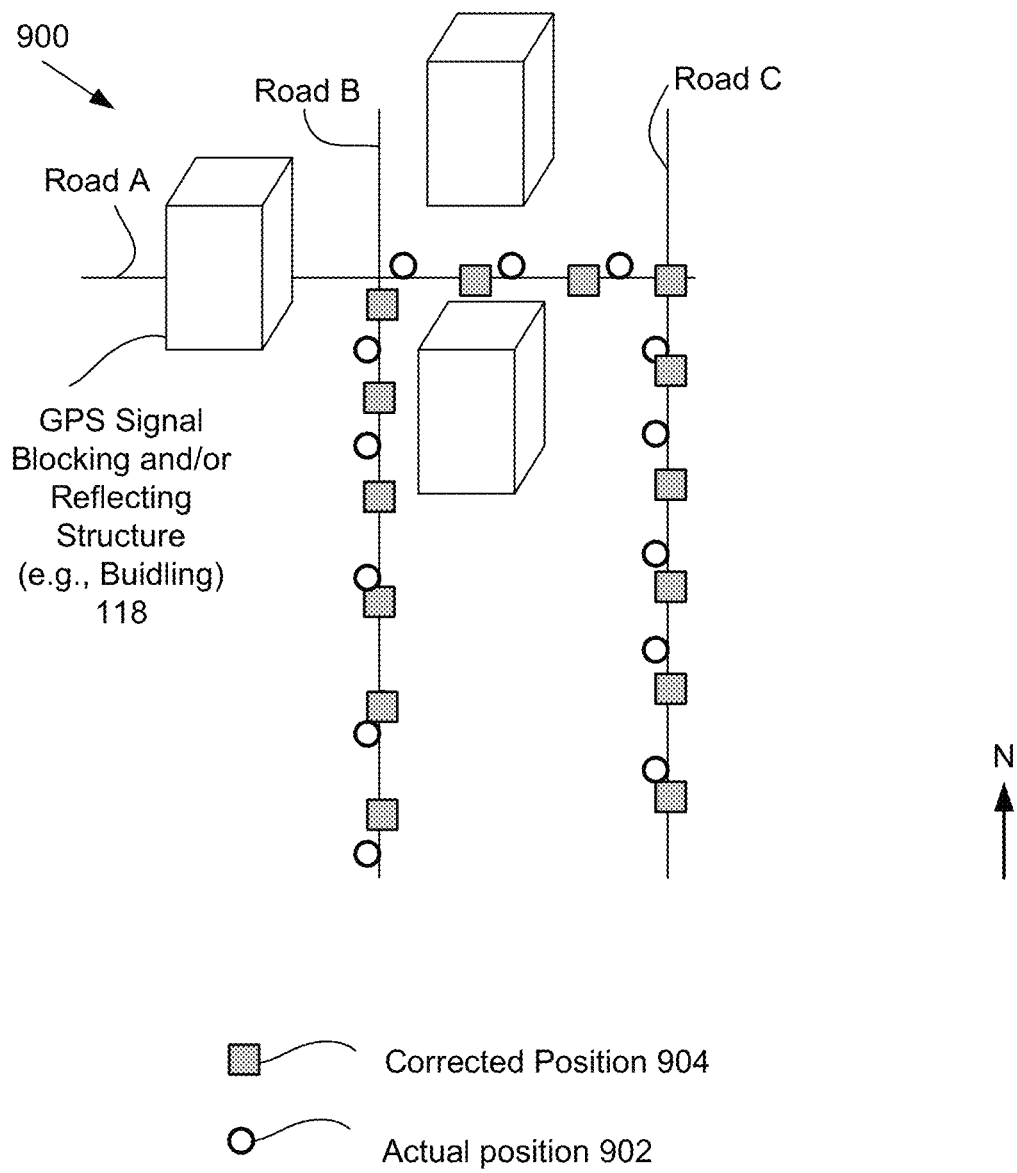
FIG. 9 illustrates a set of corrected position estimates and the set of actual positions for a wireless communication device in accordance with some embodiments.

FIG. 9 illustrates a diagram 900 of a set of corrected position estimates 904 and a set of actual positions 902 for a wireless communication device 102 in accordance with some embodiments. In one embodiment, the correction can be realized using at least a portion of a set of high confidence assistance data, e.g., data from additional sensors, map vector data, and other position information (e.g., triangulation from cellular radio towers and/or WiFi access points). The empty circles illustrate the set of actual positions 902 of the wireless communication device 102, while the shaded squares illustrate a set of corrected positions 904. The corrected positions 904 can be aligned with map features, e.g., Roads A, B, and C. The high-confidence assistance data can be used to supplement information provided from GPS estimates of the GPS module of the wireless communication device 102. In some embodiments, a portion of the high-confidence data can also be provided to the GPS module to provide for corrections of future GPS estimates output by the GPS module of the wireless communication device 102. In some embodiments, information about the "use" of the wireless communication device 102 can be taken into account in determining corrected position estimates 904. For example, velocity information and/or application usage of the wireless communication device 102 can be used to determine whether the wireless communication device 102 is operating on a road, sidewalk, pathway, off road, etc. In some embodiments, a user of the wireless communication device 102 can indicate a use that can assist in distinguishing between different use cases of the wireless communication device 102, e.g., travel by car, train, plane, bicycle, motorcycle, pedestrian, public transport, etc. In some embodiments, corrected position estimates 904 can account for different use cases. In some embodiments, logic (hardware and/or software) in the wireless communication device 102 can "align/snap" a position estimate to a map feature to display to the user of the wireless communication device 102 an estimated position. In some embodiments, a processor in the wireless communication device 102 maintains a state machine that aligns estimated positions of the wireless communication device 102 to map vector data (or information derived therefrom), e.g., "snap" to road. The map vector data can include attribute information for various map features, e.g., tunnel locations, lengths, entry points, exit points.) In some embodiments, the map vector data is assume to be accurate; in other embodiments, the map vector data can be reconfirmed based on additional information, e.g., based on a loss of GPS signal information coincident with entering a tunnel or other GPS signal blocking structure area. In some embodiments, the processor can de-emphasize or de-weight estimates provided from the GPS module when GPS satellite signals are impaired (e.g., blocked and/or otherwise interfered with). In some embodiments, reacquisition of GPS satellite signals (and time for convergence of filters in the GPS module to provide results with a particular accuracy) can be accounted for. For example, upon an exit from a GPS signal blocking structure, the tracking loops in the GPS module can require time to converge, and the number of visible satellites tracked can change over time, e.g., from zero (at exit) to one to three to four to seven to more than seven. For at least a portion of time after exiting the GPS blocking signal structure, the number of satellites visible can be inadequate to provide an accurate GPS location estimate.

Figure 10:
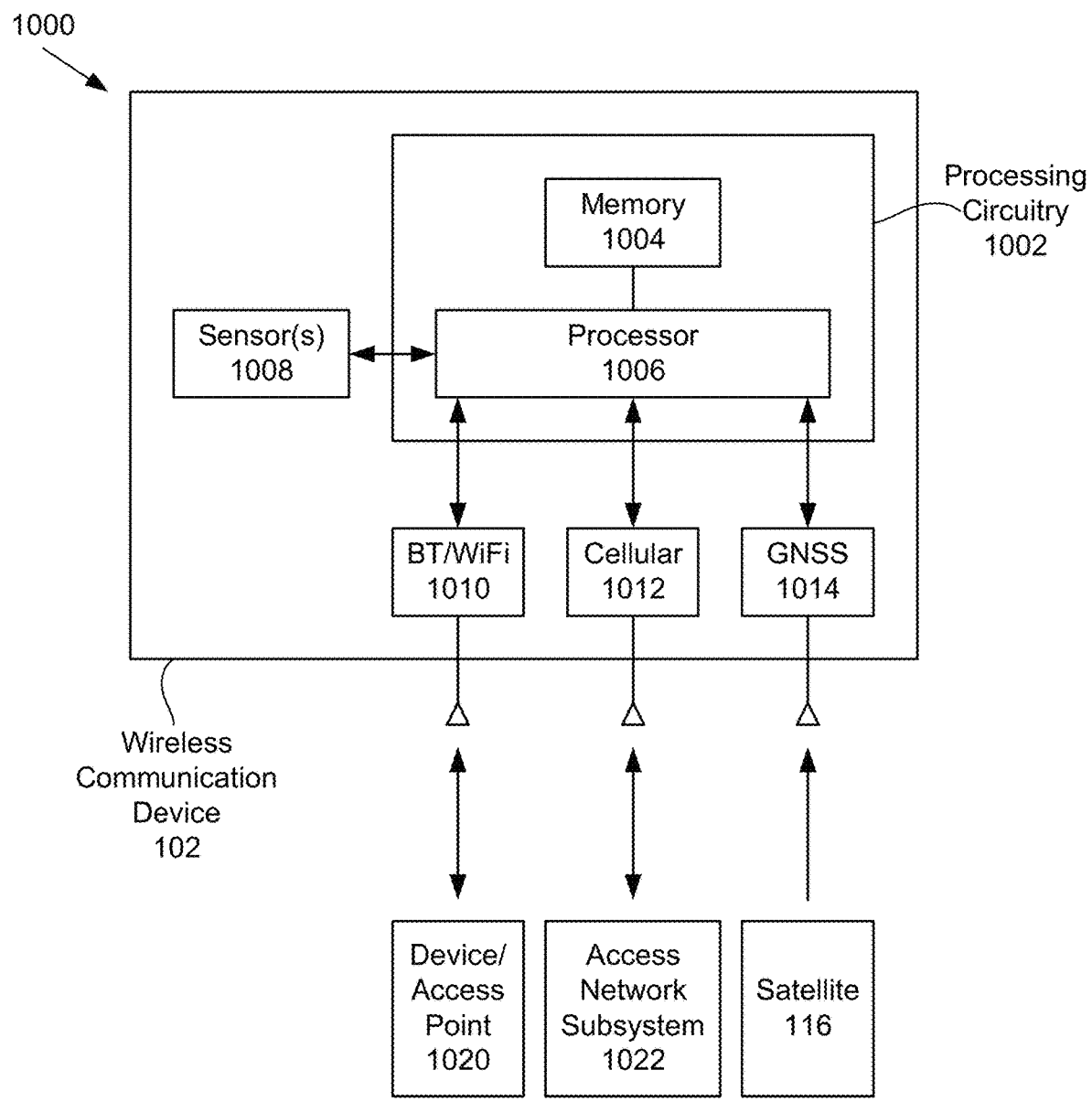
FIG. 10 illustrates a representative set of processing modules of a wireless communication device in accordance with some embodiments.

FIG. 10 illustrates a diagram 1000 of a representative set of processing modules of a wireless communication device 102 in accordance with some embodiments. The wireless communication device 102 can include processing circuitry 1002 that can execute program code stored in memory 1004 using a processor 1006 (or multiple processors) to control the wireless communication device 102. The processing circuitry 1002 can also receive input from one or more sensors 1008 contained in (and/or coupled to) the wireless communication device 102. Sensors 1008 can include accelerometers, gyroscopes, or other motion sensors, from which information can be obtained to supplement GPS position estimates. In some embodiments, the processor 1006 determines a set of estimated positions of the wireless communication device 102 to provide on a display, e.g., as part of navigation, mapping, or other programs, to a user of the wireless communication device 102. In some embodiments, the processor 1006 determines positions based on a set of GPS estimates, a set of sensor data, and a set of map vector data (e.g., obtained from memory 1004). The wireless communication device 102 can include a set of one or more wireless circuitry modules, e.g., a GNSS (or equivalently GPS) module 1014, a cellular wireless circuitry module 1012, and a wireless local/personal area networking (Bluetooth/WiFi) module 1010. The processing circuitry 1002 can interact with the wireless circuitry to transmit and receive wireless signals according to various wireless communication protocols. A wireless circuitry module (also referred to as a wireless subsystem) of the wireless communication device 102 can include transmitters and receivers to provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments. In some embodiments, the processor 1006 can determine position information based on signals received from one or more access points 1020, one or more other nearby devices 1020, one or more access network subsystems 1022 associated with cellular wireless networks, and one or more satellites 116. In some embodiments, the processor 1006 can prioritize information based on an estimate of accuracy of the information provided to determine position estimates, e.g., using GPS estimates in open areas with a high number of visible satellites with relatively strong received signals, and using cellular radio tower and/or access point data and/or sensor data in combination with map vector data when the wireless communication device 102 is located in areas of minimal or no GPS coverage (e.g., in or among GPS blocking structures 104).

Figure 11:
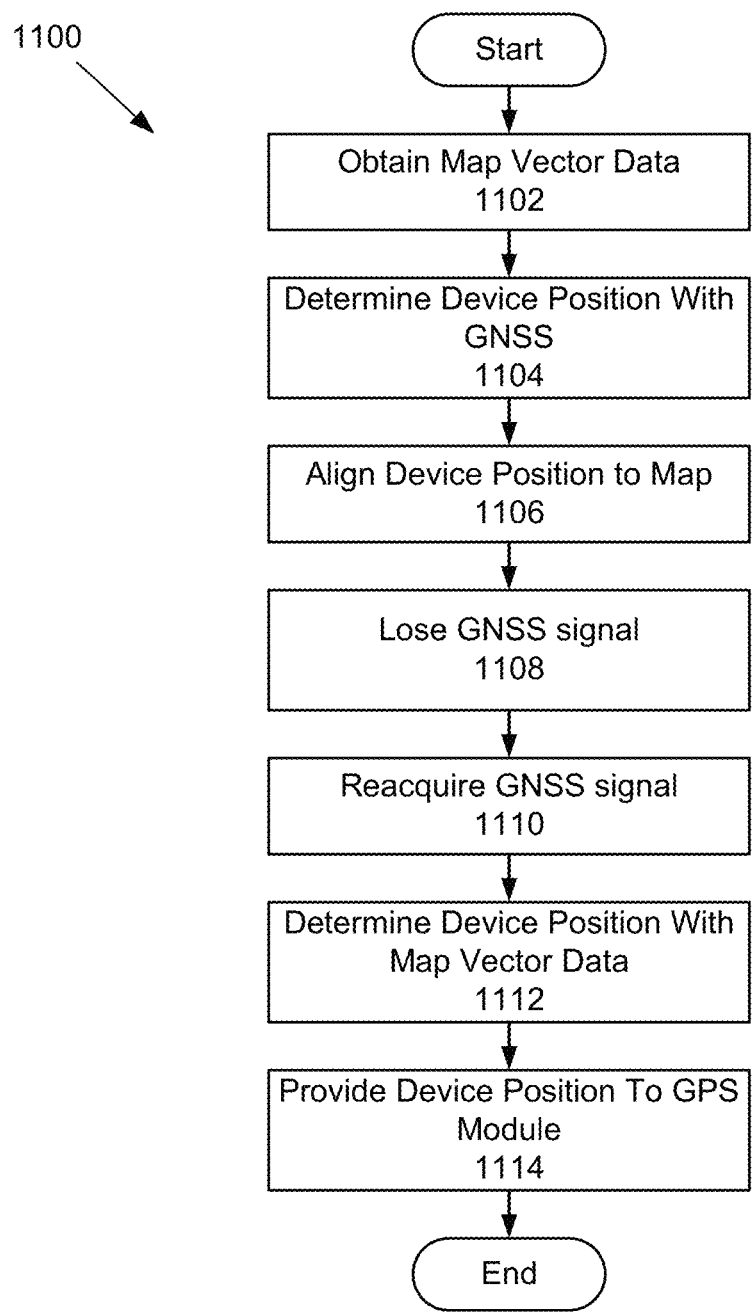
FIG. 11 illustrates a representative method to provide position assistance information for GPS position determination in a wireless communication device in accordance with some embodiments.

FIG. 11 illustrates a representative method 1100 to provide position assistance information for GPS position determination in a wireless communication device 102 in accordance with some embodiments. The flow chart of method steps can use high-confidence assistance data to improve location determination of the wireless communication device 102. Initially, at step 1102, the wireless communication device 102 can obtain map vector data. In one embodiment, map vector data can include data that defines structures and/or map features, e.g., tunnel data including position and length, and/or building data including regions of GPS blocking/reflecting/interfering signal reception. In some embodiments, map vector data can include map features, e.g., road intersections, tunnel entry points, tunnel exit points, etc. In step 1104, a position can be determined with GNSS satellite signals. In one embodiment, the wireless communication device 102 can include GNSS hardware and software (e.g., a GPS/GNSS module 1014). The wireless communication device 102 can receive GNSS satellite signals and can determine a position of the wireless communication device 102. In step 1106, the position of the wireless communication device 102 can be obtained by using the determined position from step 1104 and from map vector data obtained in step 1102. Using the determined position as a guide, the position of the wireless communication device 102 can be snapped to a feature such as a roadway included in the map vector data. In step 1108, the wireless communication device 102 can lose the GNSS signal. In one embodiment, the wireless communication device 102 can lose the GNSS signal by entering a GNSS signal blocking structure, e.g., a tunnel. In yet another embodiment, tunnel information can be included in the map vector data.

In step 1110, the wireless communication device 102 can reacquire the GNSS signal. The wireless communication device 102 can exit a GNSS signal blocking structure, e.g., a tunnel, and can seek to reacquire satellite signals. In step 1112, the wireless communication device 102 can use high-confidence location information to assist in position determination of the wireless communication device 102. In one embodiment, high-confidence location information can be based on previous determined locations of the wireless communication device 102 and map vector data stored in and/or associated with the wireless communication device 102. The high-confidence location information can be used to assist the determination of the current position of the wireless communication device 102 as the wireless communication device 102 exits from a GNSS signal blocking structure, e.g., a tunnel. In one embodiment, map vector data can be used to predict a position estimate for the wireless communication device 102, in particular as the wireless communication device 102 exits from the GNSS signal blocking structure (e.g., a tunnel). Since the position of the GNSS signal blocking structure can be included in the map vector data, as well as information about the roadway on which the wireless communication device 102 is travelling, a well-defined location prediction can be used to determine the actual position of the wireless communication device 102. In one embodiment, the tunnel/roadway information can be combined with pseudo-range information derived from GNSS satellite data to determine the position of the wireless communication device 102. In another embodiment, the tunnel/roadway information can be used to validate or to weight pseudo-range information. In yet another embodiment, tunnel/roadway information can be used to provide a seed value to a position-determining filter such as a Kalman filter, e.g., operational in the GNSS module 1014 of the wireless communication device 102. In step 1114, a position estimate of the wireless communication device 102 can be provided to the GNSS/GPS module 1014, e.g., to assist in determining subsequent GPS location estimates by the GNSS/GPS module 1014.

Figure 12:
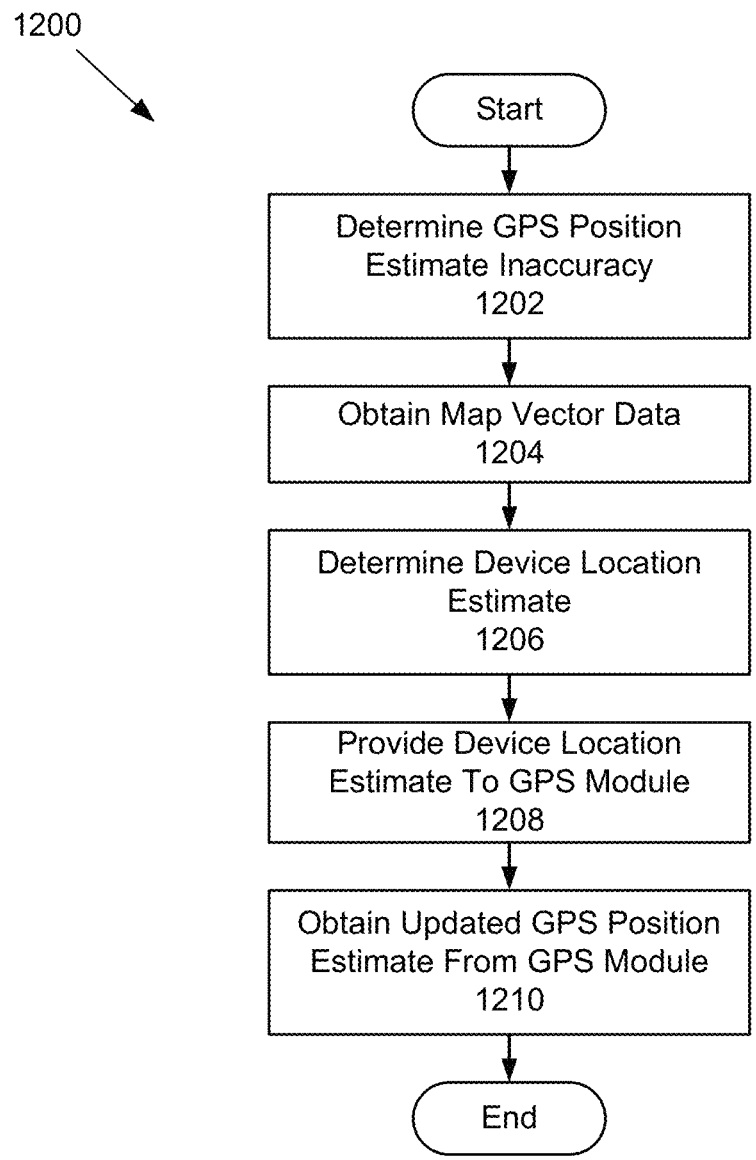
FIG. 12 illustrates another representative method to provide position assistance information for GPS position determination in a wireless communication device in accordance with some embodiments.

FIG. 12 illustrates another representative method 1200 to provide position assistance information for GPS position determination in a wireless communication device 102 in accordance with some embodiments. In step 1202, processing circuitry 1002 in the wireless communication device 102 can determine a potential or an actual inaccuracy in a GPS position estimate obtained from a GPS module (e.g., GNSS module 1014). In some embodiments, the processing circuitry 1002 obtains a set of GPS position estimates from the GPS module 1014. In some embodiments, the GPS module 1014 provides information about the GPS position estimates, e.g., number of satellite signals available, convergence, etc. In some embodiments, the processing circuitry 1002 determines potential or actual GPS accuracy by detecting (or being apprised of) a loss of GPS satellite 116 signals from one, some, or all previously visible satellite signals. In some embodiments, the processing circuitry 1002 determines potential or actual GPS accuracy by detecting (or being apprised of) signals from less than four independent GPS satellites 116. In some embodiments, the processing circuitry 1002 determines potential or actual GPS inaccuracy by detecting the GPS position estimate obtained from the GPS module 1014 does not match within a threshold a triangulated position estimate obtained using signals from cellular radio towers or from wireless local area network access points, e.g., through cellular wireless circuitry 1012 and/or through BT/Wi-Fi (or other local area networking/personal area networking) wireless circuitry 1010. In step 1204, the processing circuitry 1002 obtains a set of map vector data, e.g., from memory 1004 (or from an external system coupled to the wireless communication device 102). In some embodiments, the set of map vector data includes information about GPS signal blocking structures 104/118, roadways, intersections, entrances, exits, etc. In step 1206, the processing circuitry 1002 determines a location estimate for the mobile wireless communication device 102 based on at least a portion of the set of map vector data obtained. In some embodiments, determining the location estimate of the wireless communication device 102 includes selecting a particular exit location and position information associated with the particular exit location for a particular GPS blocking structure 104/118 (e.g., a tunnel, a building, a set of buildings, etc.) In some embodiments, determining the location estimate for the mobile wireless communication device 102 includes selecting a particular exit location from a plurality of exit locations for a particular GPS blocking structure 104/118, e.g., an exit for a tunnel, a roadway for an intersection, a branching path, etc. In step 1208, the processing circuitry 1002 provides the determined location estimate to the GPS module 1014. In some embodiments, the processing circuitry 1002 provides the determined location estimate to the GPS module 1014 with at least a portion of map vector data. In some embodiments, the determined location estimate provided to the GPS module 1014 includes a portion of the map vector data. In some embodiments, the processing circuitry 1002 provides the determined location estimate to the GPS module 1014 with a confidence measure, e.g., representing a probability of accuracy or other form of statistical bounds. In step 1210, the processing circuitry 1002 obtains an updated GPS position estimate from the GPS module 1014, the updated GPS position estimate based at least in part on the location estimate provided to the GPS module 1014. In some embodiments, the processing circuitry 1002 determines a recovery of at least one GPS satellite signal following a loss of GPS satellite signals, and the processing circuitry 1002 provides the location estimate to the GPS module 1014 following the recovery of the at least one GPS satellite signal. In some embodiments, the processing circuitry 1002 obtains a set of sensor data to supplement the set of map vector data and uses at least a portion of the set of sensor data to determine the location estimate.

Figure 13:
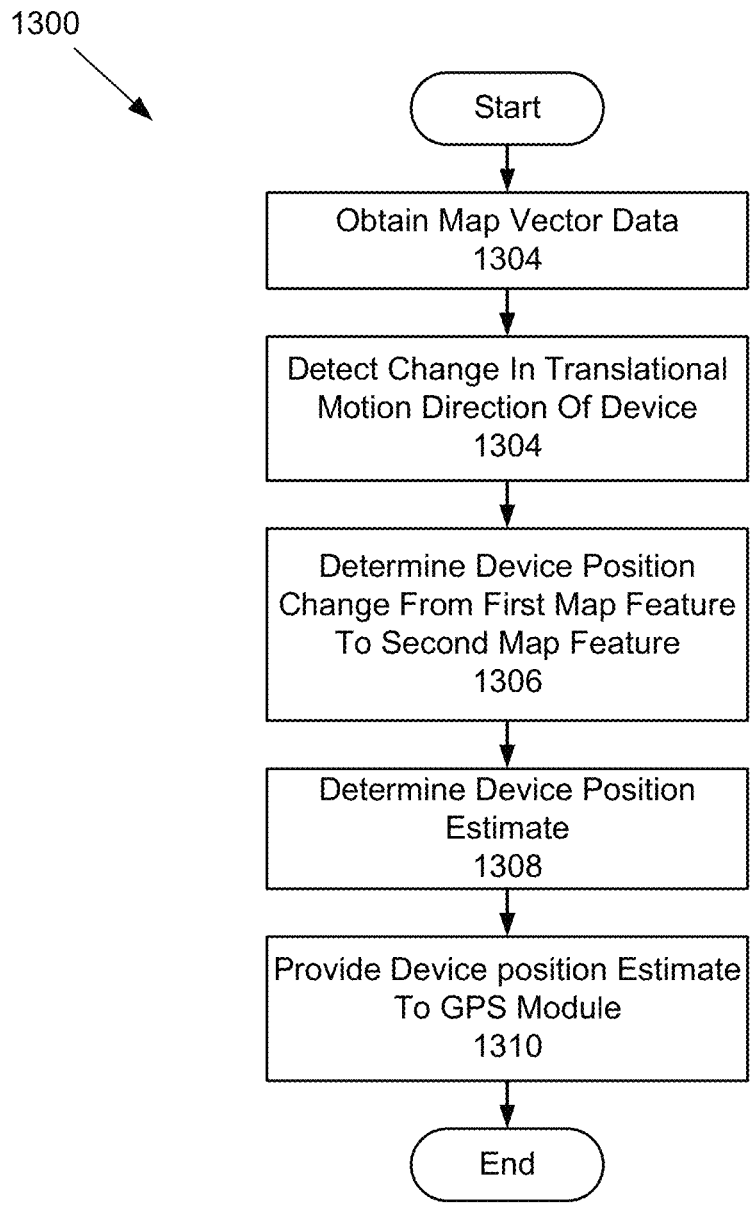
FIG. 13 illustrates a further representative method to provide position assistance information for GPS position determination in a wireless communication device in accordance with some embodiments.

FIG. 13 illustrates a further representative method 1300 to provide position assistance information for GPS position determination in a wireless communication device 102 in accordance with some embodiments. In some embodiments, the method 1300 can be performed by processing circuitry 1002 and by a GPS module 1014 in the wireless communication device 102. In some embodiments, the GPS module 1014 is configured to receive GNSS signals and to determine a GPS position of the wireless communication device 102 based at least in part on received GNSS signals. In some embodiments, the processing circuitry 1002 is coupled to the GPS module 1014 and is configured to perform steps of the method 1300. In a first step, the processing circuitry 1002 obtains a set of map vector data from a storage element in or associated with the wireless communication device 102. In some embodiments, the storage element is a memory 1004 coupled to a processor 1006 of the processing circuitry 1002. In some embodiments, the storage element is external to the wireless communication device 102, e.g., coupled through a wireless module. In step 1304, the processing circuitry 1002 detects a change in direction of translational motion of the wireless communication device 102. In some embodiments, the processing circuitry determines the change in translational motion of the wireless communication device by detecting a turn of the wireless communication device 102 based on information provided from one or more sensors 1008 in the wireless communication device 102. In some embodiments, sensors include an accelerometer and/or a gyroscope. In some embodiments, the processing circuitry 1002 in the wireless communication device 102 detects the change in direction of translational motion of the wireless communication device 102 by detecting a reduction in an uncertainty region associated with a position of the wireless communication device 102, e.g., wherein the reduction results in the uncertainty region having a value along one or more dimensions that falls below a threshold. In step 1306, the processing circuitry 1002 determines a change in position of the wireless communication device 102 from a first map feature in the set of map vector data to a second map feature in the set of map vector data. In some embodiments, the processing circuitry 1002 determines the change in position of the wireless communication device 102 from the first map feature to the second map feature by detecting the wireless communication device 102 turns from a first road onto a second road that intersects the first road. In some embodiments, the processing circuitry 1002 determines the change in position of the wireless communication device 102 by detecting an junction point based on map vector data and a likely exit point or path that the wireless communication device 102 travels through/on following the junction point. In step 1308, the processing circuitry 1002 determines a position estimate of the wireless communication device 102 based on the set of map vector data in response to the detection of the change in direction of the wireless communication device 102. In step 1310, the processing circuitry 1002 provides the position estimate of the wireless communication device 102 to a GPS module 1014 contained therein (or coupled thereto). In some embodiments, the position estimate corresponds to map vector data for an exit from a GPS signal blocking structure that obstructs the reception of GPS signals from satellites 116. In some embodiments, the position estimate corresponds to map vector data associated with an intersection of a first road and a second road at which a change in direction of the wireless communication device 102 is detected. In some embodiments, the GPS module 1014 uses the position estimate to initialize an adaptive filter to determine additional GPS positions of the wireless communication device 102. In some embodiments, the wireless communication device 102 includes cellular wireless circuitry 1012 configured to transmit signals to and receive signals from a cellular wireless network, and the processing circuitry 1002 determines the change in position of the wireless communication device 102 based at least in part on signals received from a plurality of cellular radio access network systems 1022 of the cellular wireless network. In some embodiments, the wireless communication device 102 includes wireless local area network circuitry 1020 configured to transmit signals to and receive signals from a wireless local area network, and the processing circuitry 1002 determines the change in position of the wireless communication device 102 based at least in part on signals received from a plurality of access points 1020 of the wireless local area network.

Representative applications of methods and apparatus according to the present application are described in this section. These examples are provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the examples presented should not be taken as limiting.

In the detailed description provided herein, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the scope of the described embodiments.

The various aspects, embodiments, implementations or features of the described embodiments can be used separately or in any combination. Various aspects of the described embodiments can be implemented by software, hardware or by a combination of hardware and software. The described embodiments can also be embodied as computer readable code on a non-transitory computer readable medium. The non-transitory computer readable medium is any data storage device that can store data and can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless communication device, comprising:
a global positioning system (GPS) module configured to receive global navigation satellite system (GNSS) signals and to determine GPS positions of the wireless communication device based at least in part on received GNSS signals; and
processing circuitry coupled to the GPS module, the processing circuitry configured to control the wireless communication device to at least:
obtain a set of map vector data from a storage element in or associated with the wireless communication device;
detect a change in direction of translational motion of the wireless communication device at an intersection of a first road and a second road;
determine a change in position of the wireless communication device from a first map feature in the set of map vector data to a second map feature in the set of map vector data;
determine, before and after the change in direction and position of the wireless communication device, using i) a set of GPS positions from the GPS module and ii) the map vector data, an uncertainty region comprising a set of position estimates of the wireless communication device, each position estimate associated with a probability of occurrence; and
responsive to observing a change in properties of the uncertainty region before and after the change in direction of translational motion at the intersection: determine a particular position estimate of the wireless communication device based on the set of map vector data and the set of position estimates of the uncertainty region; and provide the particular position estimate to the GPS module to assist the GPS module to determine subsequent GPS positions of the wireless communication device.

2. The wireless communication device recited in claim 1, wherein the processing circuitry determines the change in position of the wireless communication device from the first map feature to the second map feature by detecting a turn of the wireless communication device from the first road onto the second road that intersects the first road.

3. The wireless communication device recited in claim 2, wherein the processing circuitry provides map vector data associated with the intersection of the first road and the second road along with the particular position estimate to the GPS module.

4. The wireless communication device recited in claim 1, wherein the processing circuitry determines the change in direction of translational motion of the wireless communication device by at least detecting a turn of the wireless communication device based on information provided from one or more sensors in the wireless communication device comprising at least one of an accelerometer and a gyroscope.

5. The wireless communication device recited in claim 1, wherein the particular position estimate comprises a median point of the uncertainty region.

6. The wireless communication device recited in claim 1, wherein the processing circuitry observes the change in properties of the uncertainty region by at least detecting a change in a length of the uncertainty region before and after the change in direction.

7. The wireless communication device recited in claim 1, further comprising cellular wireless circuitry configured to transmit signals to and receive signals from a cellular wireless network, and wherein the processing circuitry determines the change in position of the wireless communication device based at least in part on signals received from a plurality of cellular radio access network systems of the cellular wireless network.

8. The wireless communication device recited in claim 1, further comprising wireless local area network circuitry configured to transmit signals to and receive signals from a wireless local area network, and wherein the processing circuitry determines the change in position of the wireless communication device based at least in part on signals received from a plurality of access points of the wireless local area network.

9. The wireless communication device recited in claim 1, wherein the GPS module is further configured to use the particular position estimate to initialize an adaptive filter of the GPS module to determine subsequent GPS positions of the wireless communication device.

10. A method to assist a global positioning system (GPS) module to determine GPS position estimates for a wireless communication device, the method comprising:

by the wireless communication device:

obtaining a set of map vector data from a storage element in or associated with the wireless communication device;

detecting a change in direction of translational motion of the wireless communication device at an intersection of a first road and a second road;

determining a change in position of the wireless communication device from a first map feature in the set of map vector data to a second map feature in the set of map vector data;

determining, before and after the change in direction and position of the wireless communication device, using i) a set of GPS positions from the GPS module and ii) the map vector data, an uncertainty region comprising a set of position estimates of the wireless communication device, each position estimate associated with a probability of occurrence; and responsive to observing a change in properties of the uncertainty region before and after the change in direction of translational motion at the intersection:

determining a particular position estimate of the wireless communication device based on the set of map vector data and the set of position estimates of the uncertainty region; and providing the particular position estimate to the GPS module to assist the GPS module to determine subsequent GPS positions of the wireless communication device.

11. The method recited in claim 10, wherein determining the change in position of the wireless communication device from the first map feature to the second map feature comprises detecting a turn of the wireless communication device from the first road onto the second road that intersects the first road.

12. The method recited in claim 11, wherein the particular position estimate is provided to the GPS module along with map vector data associated with the intersection of the first road and the second road.

13. The method recited in claim 10, wherein determining the change in direction of translational motion of the wireless communication device comprises detecting a turn of the wireless communication device based on information provided from one or more sensors in the wireless communication device.

14. The method recited in claim 10, wherein observing the change in properties of the uncertainty region comprises detecting a change in a length of the uncertainty region before and after the change in direction.

15. The method recited in claim 10, wherein determining the change in position of the wireless communication device is based at least in part on signals received from a plurality of cellular radio access network systems of a cellular wireless network.

16. The method recited in claim 10, wherein determining the change in position of the wireless communication device is based at least in part on signals received from a plurality of access points of a wireless local area network.

17. An apparatus configurable for operation in a wireless communication device, the apparatus comprising one or more processors communicatively coupled to memory storing instructions that, when executed by the one or more processors, cause the wireless communication device to at least:

obtain a set of map vector data from a storage element in or associated with the wireless communication device;

detect a change in direction of translational motion of the wireless communication device at an intersection of a first road and a second road;

determine a change in position of the wireless communication device from a first map feature in the set of map vector data to a second map feature in the set of map vector data;

determine, before and after the change in direction and position of the wireless communication device, using i) a set of GPS positions from a GPS module and ii) the map vector data, an uncertainty region comprising a set of position estimates of the wireless communication device, each position estimate associated with a probability of occurrence; and responsive to observing a change in properties of the uncertainty region before and after the change in direction of translational motion at the intersection:
  determine a particular position estimate of the wireless communication device based on the set of map vector data and the set of position estimates of the uncertainty region; and
  provide the particular position estimate to the GPS module to assist the GPS module to determine subsequent GPS positions of the wireless communication device.

18. The apparatus as recited in claim 17, wherein the particular position estimate is provided to the GPS module along with map vector data associated with the intersection of the first road and the second road.

19. The apparatus as recited in claim 17, wherein the particular position estimate comprises a median point of the uncertainty region.

20. The apparatus as recited in claim 17, wherein observing the change in properties of the uncertainty region comprises detecting a change in a length of the uncertainty region before and after the change in direction.

* * * * *